United States Patent [19]

Ross, Jr.

[11] Patent Number: 4,842,963
[45] Date of Patent: Jun. 27, 1989

[54] ZINC ELECTRODE AND RECHARGEABLE ZINC-AIR BATTERY

[75] Inventor: Philip N. Ross, Jr., Kensington, Calif.

[73] Assignee: The United States of America as represented by the United States Department of Energy, Washington, D.C.

[21] Appl. No.: 209,592

[22] Filed: Jun. 21, 1988

[51] Int. Cl.$^4$ .................................. H01M 8/06
[52] U.S. Cl. .................................. 429/21; 429/27; 429/105; 29/623.1
[58] Field of Search .................. 429/15, 27, 105, 21; 29/623.1

[56] References Cited

U.S. PATENT DOCUMENTS

| | | | |
|---|---|---|---|
| 4,115,626 | 9/1978 | Sauer et al. | 429/27 |
| 4,328,287 | 5/1982 | Sammells et al. | 429/15 |
| 4,517,258 | 5/1985 | Bromoel | 429/21 |
| 4,551,399 | 11/1985 | Despic | 429/27 |

OTHER PUBLICATIONS

Foller, Improved Slurry Zinc/Air Systems as Batteries for Urban Vehicle Propulsion, Journal of Applied Electrochem, vol. 16, (1986), pp. 527–543.
Iacovangelo et al., Parametric Study of Zinc Deposition on Porous Carbon in a Flowing Electrolyte Cell, Journal of the Electrochemical Society, vol. 132 (1985), p. 851.
Will et al., An X-Ray Radiography–Densitometry Technique for Quantitative Determination of Metal Deposit Profiles, Journal of the Electrochemical Soc., vol. 131, No. 3, Mar. 1984, pp. 590–595.

*Primary Examiner*—Donald L. Walton
*Attorney, Agent, or Firm*—L. E. Carnahan; Roger S. Gaither; Judson R. Hightower

[57] ABSTRACT

An improved zinc electrode is disclosed for a rechargeable zinc-air battery comprising an outer frame and a porous foam electrode support within the frame which is treated prior to the deposition of zinc thereon to inhibit the formation of zinc dendrites on the external surface thereof. The outer frame is provided with passageways for circulating an alkaline electrolyte through the treated zinc-coated porous foam. A novel rechargeable zinc-air battery system is also disclosed which utilizes the improved zinc electrode and further includes an alkaline electrolyte within said battery circulating through the passageways in the zinc electrode and an external electrolyte circulation means which has an electrolyte reservoir external to the battery case including filter means to filter solids out of the electrolyte as it circulates to the external reservoir and pump means for recirculating electrolyte from the external reservoir to the zinc electrode.

20 Claims, 4 Drawing Sheets

ZINC ELECTRODE AND RECHARGEABLE ZINC-AIR BATTERY

BACKGROUND OF THE INVENTION

The Government has rights in this invention pursuant to Contract No. DE-AC03-76SF00098 between the U.S. Department of Energy and the University of California.

This invention relates to rechargeable zinc-air cells or batteries. More particularly, this invention relates to an improved zinc electrode and a rechargeable zinc-air cell or battery having an electrolyte system which permits removal and/or external processing of the electrolyte.

Zinc-air primary (non-rechargeable) cells are known in the art. For example, Sauer et al U.S. Pat. No. 4,115,626 describe a zinc/air primary cell having a negative electrode comprising a zinc plate and carbon positive electrodes. The cell is housed in a plastic shell formed with an electrolyte reservoir at the top and perforations which permit the electrolyte to flow down into contact with the electrodes. The zinc electrode plate is housed in a plastic frame to inhibit anodic dissolution of the rim of the zinc plate.

Sammells et al U.S. Pat. No. 4,328,287 disclose a cell having a porous electrode through which is passed a colloid of an oxidizable gas in electrolyte. The cell may be a primary cell with a counter electrode comprising a consumable metal such as zinc. The electrolyte is supplied to a colloid-forming region in the cell by electrolyte supply means which include an electrolyte recycle pump means and an electrolyte treating means for removing reaction products from the electrolyte and suitably treating the electrolyte for recycling through a distributor or manifold to the colloid forming region of the cell.

Despic U.S. Pat. No. 4,551,399 describes a bipolar primary type battery comprising self-perpetuating wedge-shaped disposable anodes comprising pressed zinc powder. Electrical contact is established between the anode of one cell and the cathode of the adjacent cell through the wall which separates the two cells. The self-perpetuating semiwedge anodes each have a rectangular triangle as a base, and the self-perpetuation of the wedge is effected by dissolving the anode from one side only, the side where the cathode is placed at the appropriate angle.

However, the use of a zinc electrode in a secondary (rechargeable) cell presents problems due to the formation of zinc dendrites during the recharging of the cell which will interfere with subsequent oxidation and reduction (discharging and recharging) of the zinc electrode and, thus, reduce the number of cycles during which the cell will deliver its full charging and discharging capabilities.

Various methods and schemes have been proposed to avoid or mitigate the zinc dendrite formation problem. For example, Bronoel U.S. Pat. No. 4,517,258 teaches the construction of a cell with a zinc negative electrode comprising spherically shaped particles which circulate in the electrolyte. The particles have a chemically resistant core and are coated with a conductive coating. The particles are charged and discharged by contact with a collector, e.g., they become coated with zinc when in contact with a collector more negative than that corresponding to the zinc deposit and in the presence of a zincate solution. The particles circulate in a KOH electrolyte which is pumped through the battery. The electrolyte drains off into a storage tank from which it is pumped back through the battery. The use of a floating negative electrode is said to inhibit the formation of zinc dendrites.

Primary zinc-air cells, as described above, normally are provided with a zinc plate which serves as the consumable zinc electrode. When all of the zinc plate electrode is consumed, either the cell is discarded or the electrode replaced. However, to construct a rechargeable zinc-air cell, it is also necessary to provide a substrate for the zinc electrode which will be inert to the electrochemical reactions in the cell and which will provide a support upon which the reduced zinc may be deposited during recharging of the cell. Furthermore, it would be desirable for such a support to have some form of porosity which would enlarge the surface area of the support material to thereby extend the capacity of the zinc electrode.

Iacovangelo et al, in an article entitled "Parametric Study of Zinc Deposition On Porous Carbon in a Flowing Electrolyte Cell", published in the *Journal of the Electrochemical Society*, Volume 132 (1985), at page 851, describe the use of carbon foams as substrates for zinc electrodes in rechargeable zinc-bromine cells. The use of such a carbon foam provides an extended surface area upon which the reduced zinc may be deposited during recharging and reduction of the zinc, as well as a support surface which provides some degree of chemical inertness to the electrochemical reactions occurring in the cell. However, the formation of zinc dendrites on the surface of the foam during reduction of the zinc eventually blocks access to the inner surfaces of the foam and thereby eventually reduces the capacity of the electrode after a number of charging and recharging cycles.

It would, therefore, be desirable to provide a rechargeable zinc electrode having a support surface of extended area which will provide a high capacity electrode while providing means for inhibiting the formation of zinc dendrites on the surfaces of the electrode.

It would be further desirable to form a rechargeable zinc-air cell/battery using such an electrode wherein an alkaline electrolyte could be circulated through the zinc electrode as well as other portions of the cell and then the electrolyte could be further processed or replaced as needed at a point external to the cell.

SUMMARY OF THE INVENTION

It is, therefore, an object of this invention to provide a rechargeable zinc-air cell/battery having a rechargeable zinc electrode having a support surface of extended area which will provide a high capacity electrode while providing means for inhibiting the formation of zinc dendrites on the surface of the electrode.

It is another object of this invention to provide a rechargeable zinc-air cell/battery having a rechargeable zinc electrode comprising a porous foam support with means thereon for inhibiting the formation of zinc dendrites on the surface of the electrode, to thereby form an extended electrode support surface area on which is formed a high capacity zinc electrode.

It is yet another object of this invention to provide a rechargeable zinc-air cell/battery having a rechargeable zinc electrode comprising a porous foam support selected from the class consisting of metal foam and carbon foam, with means thereon for inhibiting the formation of zinc dendrites on the surface of the electrode, to thereby form an extended electrode support surface area on which is formed a high capacity zinc electrode.

It is a further object of this invention to form a rechargeable zinc-air cell/battery using such a porous zinc electrode wherein an alkaline electrolyte could be circulated through the zinc electrode as well as other portions of the cell/battery and then further processed or replaced as needed at a point external to the cell/battery.

These and other objects of this invention will be apparent from the following description and accompanying illustrations.

DETAILED DESCRIPTION OF THE INVENTION

The invention comprises an improved rechargeable zinc-air cell/battery having recirculating alkaline electrolyte and a zinc electrode comprising a porous foam support material which carries the active zinc electrode material.

Figure 1:
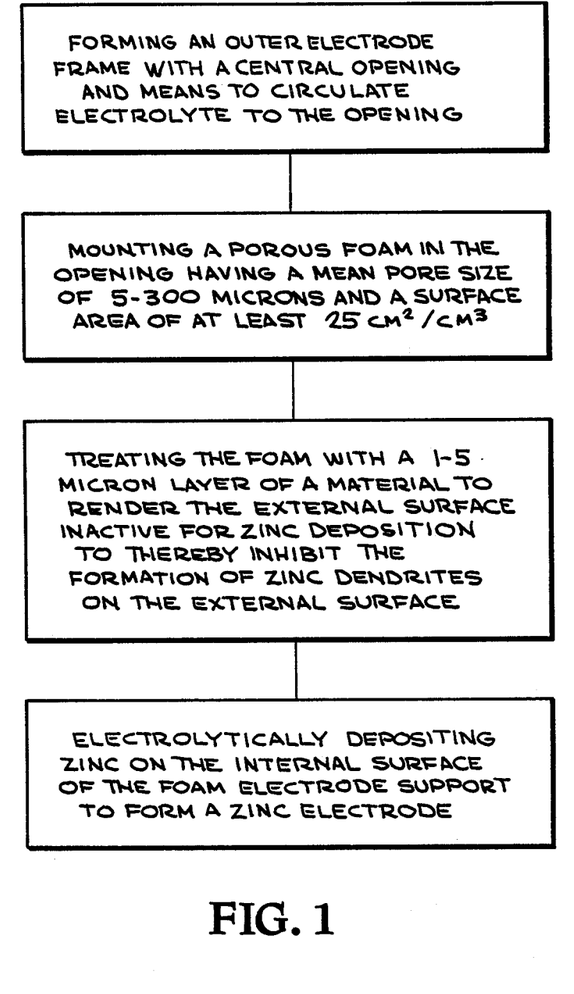
FIG. 1 is a flow sheet illustrating the process of the invention.
Figure 2:
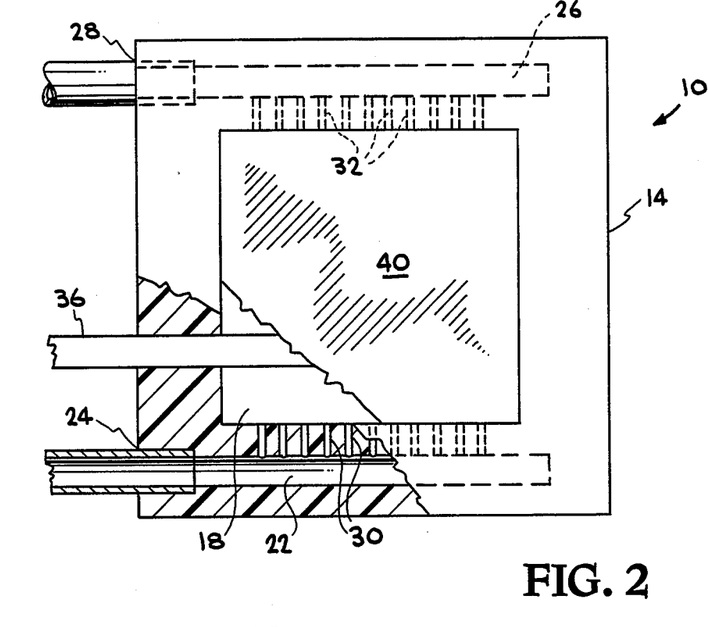
FIG. 2 is a side view, partially in section, showing the zinc electrode of the invention.

Referring to FIG. 2, the zinc electrode of the invention is generally indicated by numeral 10 and comprises a rectangular plastic frame 14 which may be formed from polypropylene, polyethylene, polytetrafluoroethylene, or any other plastic material possessing sufficient mechanical strength as well as generally exhibiting chemical inertness to the alkaline electrolyte as well as the electrochemical reactions taking place in each cell as will be explained below.

Plastic electrode frame 14 is formed with a central opening 18 within which the porous foam electrode support material 40 is carried. Electrode frame 14 is further provided with a lower horizontal bore 22 extending into the bottom portion of the frame from a port 24 in the side of frame 14 and terminating just beyond the width of central opening 18 in frame 14. A second, upper, horizontal bore 26 extends into the top portion of frame 14 from a port 28 also provided in the side of frame 14.

Frame 14 is further provided with a first series of generally parallel vertical bores 30 which extend up from lower horizontal bore 22 to cutout 18 and a second set of generally parallel vertical bores 32 which extend down from upper horizontal bore 26 to cutout 18.

Frame 14 may be constructed either by molding or cutting polymeric material to the desired shape and bores 22, 26, 30, and 32 may then be drilled into frame 14. Alternatively, frame 14 may comprise two molded half sections with grooves molded into the half sections to form the desired bores when the half sections are secured together.

In accordance with the invention, within cutout or opening 18 in frame 14 is mounted porous foam material 40 which will form the conductive support material for the zinc electrode to be formed. Porous foam material 40 may comprise a carbon foam or a metal foam. Foam material 40 will generally have a mean pore size of from about 5 to about 300 microns, preferably from about 10 to about 100 microns, and a surface area of at least about 25 centimeter$^2$ (cm$^2$) for each cubic centimeter (cm$^3$) of volume, preferably a surface area of at least about 50 cm$^2$/cm$^3$.

Metal foam shaving such characteristics such as, for example, copper or nickel foams, are commercially available, for example, from Foam et al, Inc. under the trademark Foam et al. Preferably, to achieve high current efficiency for the zinc reaction, such metal foams are plated with lead before use as zinc substrates. Any other may be used as the metal foam providing that their position in the electromotive series, with respect to zinc,is such that the oxidation-reduction of the zinc in the electrode is not interfered with.

Carbon foam material having such porosities and surface areas are commercially available, for example, as "reticulated vitreous carbon" from the Fluorocarbon Company or "carbon felt" from Fibre Materials, Inc. Carbon foam is preferred over the metal foams in terms of weight because of the low density of carbon fibers relative to metal fibers, e.g., 1.4 versus 6-7 grams/cubic centimeter(g/cm$^3$).

To provide external electrical contact to the electrode, a conductive metal tab 36 may be mounted in the sidewall of frame 14 which tab extends in one direction through the sidewall of frame 14 to electrically communicate with the foam in opening 18, and in the opposite direction through the wall of battery case 52 (to be described below) for external connection thereto.

In accordance with the invention, the external surface of the carbon or metal foam is given a treatment, prior to deposition of the active zinc metal thereon, to render the treated surface inactive for zinc deposition. This treatment may be done by applying a thin, e.g., 1–5 micron, layer of an electrically insulating and electrochemically inert material. This may be carried out in a variety of ways such as, for example by spraying with a polymeric material such as fluoroethylenepropylene (DuPont FEP), polyvinylidene fluoride (Pennwalt Kynar), or tetrafluoroethylene (DuPont TEFLON).

The purpose of the treatment of the foam support material is to inhibit the undesirable formation of zinc dendrites on the outer surface of the foam. While it is not desired to be bound by any particular theory, it is thought that the treatment of the foam may inhibit subsequent deposit of the zinc on the outer surfaces of the foam and thus prevent the formation of zinc dendrites in those outer surface portions of the foam facing the separator where dendrite formation could penetrate the separator material and contact the positive (air) electrode, thereby shorting the cell.

By use of the terms "external surface" or "outer surface", with respect to the foam, is meant the surface of the foam which faces the separators on each side of the electrode.

After the above treatment of the outer surface of the metal or carbon foam, a thin layer of metallic zinc is then pre-plated on the inner surfaces of the foam electrolytically. This pre-plated zinc serves as a template for deposition of zinc from the battery electrolyte in the charging cycle. The best pre-plating of zinc is obtained by use of acid baths, e.g., from an acidified zinc sulfate such as from about grams/liter (g/l) to about 100 g/l zinc as zinc sulfate in a sulfuric acid bath having a concentration of from about 10 g/l to about 100 g/l sulfuric acid, and also containing 10 to 500 mg/l of an organic colloid such as gum arabic or dextrin.

Particularly when carbon foam is used, it is preferable that the first 15 to 35 wt. % of the zinc, more preferably at least about 25 wt. % of the zinc, should be deposited using a pulse plating technique to produce zinc nuclei distributed uniformly throughout the internal area of the foam surface. The final 65 to 85 wt. % of the zinc, preferably about 75 wt. %, can be deposited at constant current.

By pulse plating is meant plating by use of short periods of high current followed by periods of zero current. The best pre-plating is observed using 60 Hz (on-off) pulses of 0.4 to 4 amps/cm$^2$ of external area of the foam. The final pre-plating is best done at 0.04 to 0.4 amps/cm$^2$. The total amount of pre-plated zinc should be about 5 to 25 mg of zinc per cm$^3$ of foam. The total electrolytic (charge or discharge) capacity of foam electrodes in this invention can be as high as 0.3 to 0.4 ampere hours/cm$^3$ (Ah/cm$^3$), but best results as a rechargeable battery are obtained using only 0.1 to 0.2 Ah/cm$^3$.

Figure 3:
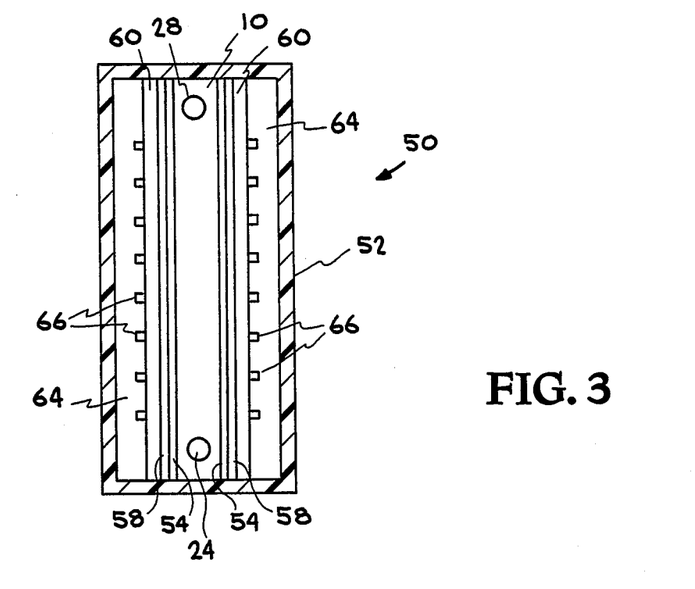
FIG. 3 is a end section view of the novel rechargeable zinc-air cell of the invention.
Figure 4:
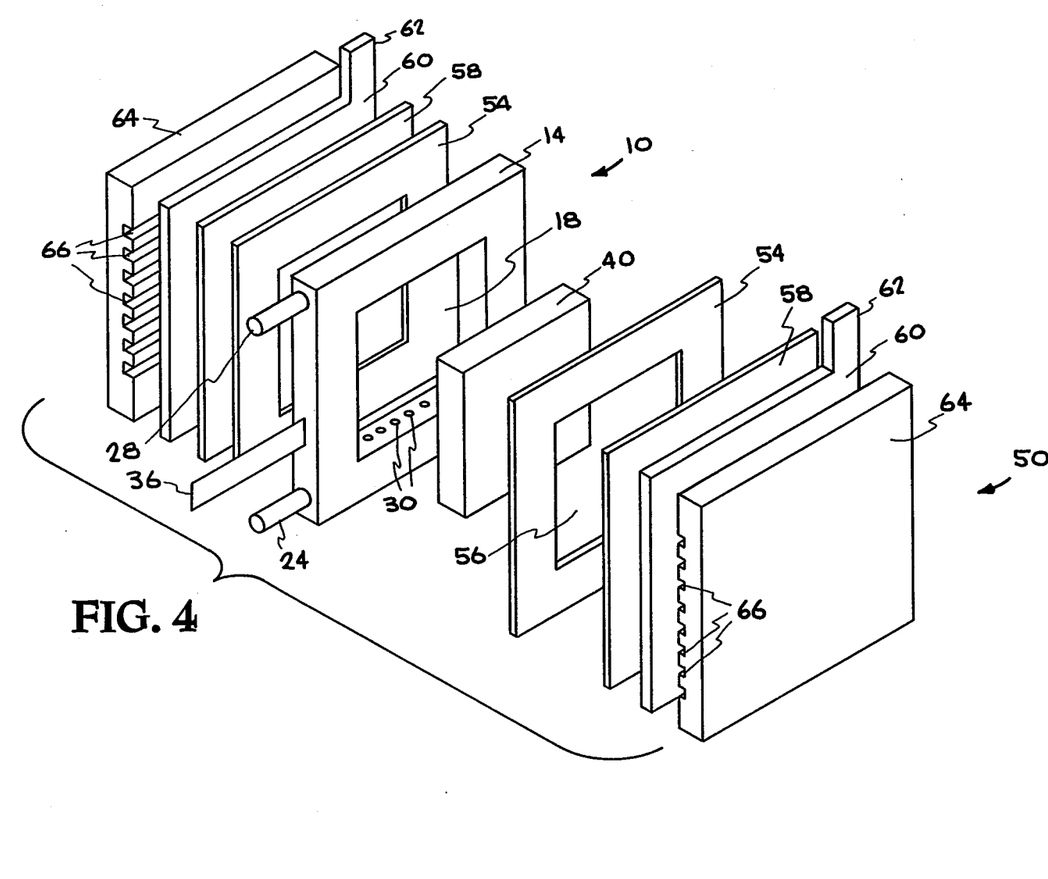
FIG. 4 is an exploded view showing the components of the novel rechargeable zinc-air cell of the invention made with the zinc electrode of the invention.

Turning now to FIGS. 3 and 4, a zinc-air cell 50 is generally illustrated (in an end view in FIG. 3 and in an exploded view in FIG. 4) comprising a case 52 containing the just described zinc electrode 10, a gasket member 54, a porous separator 58, an air electrode 60 having a conductive tab 62 thereon for external connection to electrode 60, and an air electrode backing plate 64. As more completely shown in FIG. 3, zinc-air cell 50 will, preferably, comprise an air electrode and accompanying gaskets, separators, and air electrode backing plates on each side of the zinc electrode.

Case 52 may comprise any structurally strong and chemically inert insulation material such as, for example, the hard rubber cases normally used for lead acid batteries. Any other customary non-conductive battery case material may be used in the construction of case 52.

Gasket member 54 may be formed of any generally resilient or elastomeric material, such as, for example, an ethylene-propylene copolymer or a styrene butadiene polymer, which will be generally inert to the electrochemical reactions within the cell. Gasket 54 will be formed with a central opening 56 generally similar, but slightly larger in cross-section to opening 18 in electrode frame 14 to permit communication to all of the zinc-impregnated foam in electrode 10. The thickness of gasket 54 may vary from about 0.5 to about 1.5 millimeters. The purpose of gasket 54 is to provide a seal between separator 58 and zinc electrode 10 to permit the alkaline electrolyte circulating within electrode 10 to wet the surface of separator 58 without permitting leakage of the electrolyte into the air space 72 (which will be described below) between the cell members and battery case 52.

Separator 58 comprises a porous insulation material such as, for example, porous zirconia felt available from Zircor Products, Inc. with an overlayer of Cell Guard cellulose fiber material available from the Celanese Corporation. The total thickness of separator 58 may vary from about 0.5 to about 1.0 millimeters.

Air electrode 60 may comprise any known air electrode useful with a zinc electrode to form a zinc-air cell. Preferably, however, air electrode 60 will comprise a carbonaceous electrode formed from preselected carbon black material which has been heat treated at a temperature of from about 2500° to 3000° C. in an inert atmosphere. Such an air electrode and a method of making same are described in copending application Ser. No. 07/209,397, filed on 06/21/88, entitled NOVEL AIR ELECTRODE FOR METAL-AIR BATTERY WITH NEW CARBON MATERIAL AND METHOD OF MAKING SAME, which is assigned to the assignee of this invention.

Air electrode backing plate 64 comprises a insulation material such as polypropylene or polytetrafluoroethylene which acts to space air electrode 60 from the sidewall of case 52 as well as to permit the flow of air to air electrode 60 through a series of grooves 66 molded into the side surface of backing plate 64 facing air electrode 60.

The electrolyte used in the cell or battery of the invention comprises an alkaline electrolyte having both high conductivity and a high solubility for zincate ion. The best electrolytes are those based on concentrated potassium hydroxide with additives that improve zincate solubility, e.g., potassium silicate and sorbitol. Examples of electrolytes having the desired properties are those described by Foller in the *Journal of Applied Electrochemistry*, Volume 16 (1986), at page 527.

The terms "battery" or "zinc-air battery", as used herein, are intended to broadly define either (1) a plurality of zinc-air cells which each contain one zinc electrode constructed in accordance with the invention and either one air electrode facing one side of the zinc electrode or two air electrodes respectively facing both sides of the zinc electrode; or (2) a single cell, i.e., a cell having a single zinc electrode constructed in accordance with the invention and either one air electrode facing one side of the zinc electrode or two air electrodes respectively facing both sides of the zinc electrode. The terms "cell" or "zinc-air cell", as used herein, are intended to mean only a single cell as defined above.

Figure 5:
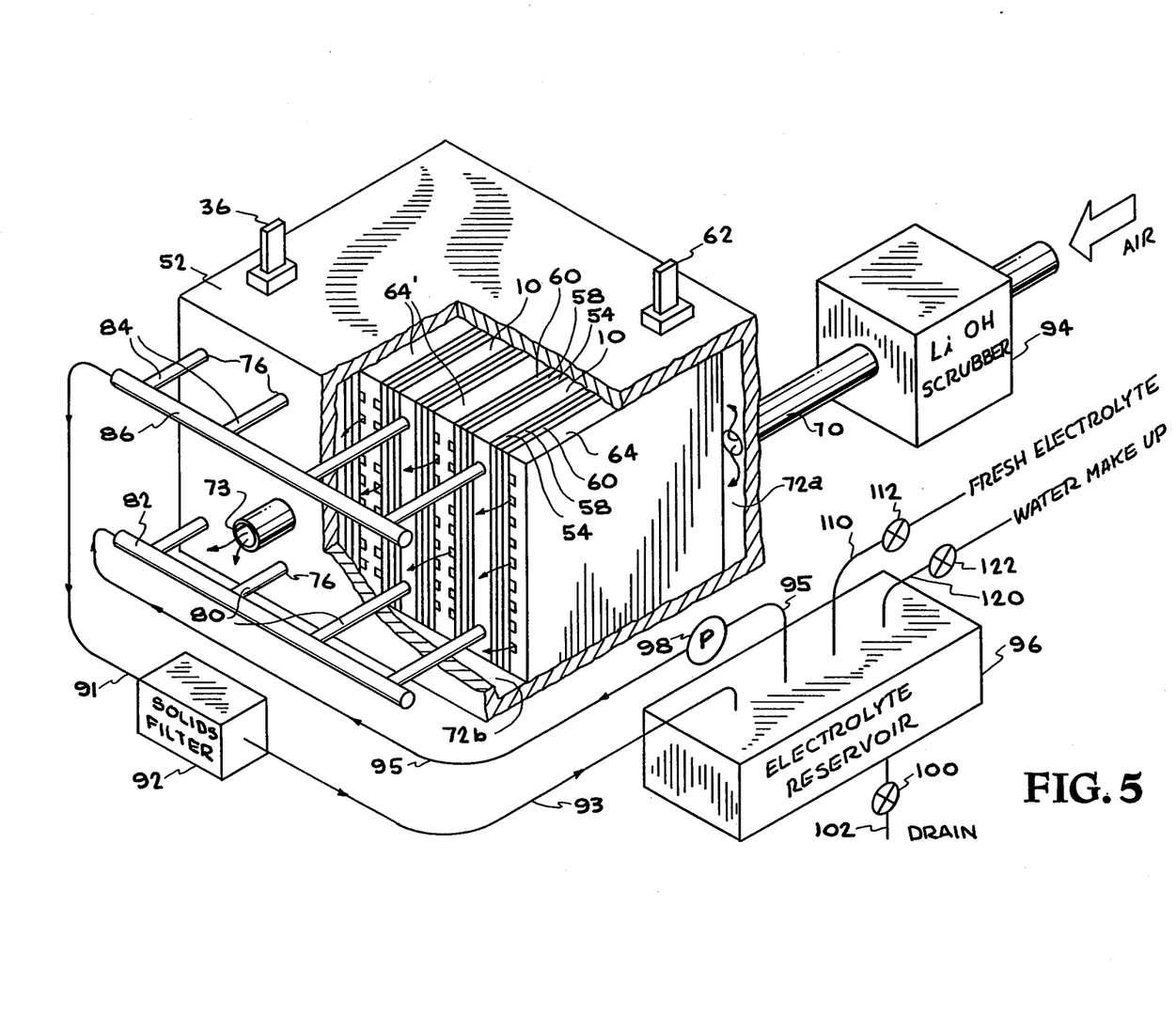
FIG. 5 is a top view of a multicell rechargeable zinc-air battery constructed accordance with the invention.

Referring now to the view of FIG. 5, which shows several of the zinc-air cells just described sandwiched together to form a multicell battery, it will be noted that battery case 52 is provided with openings 70 through which air may be admitted into the battery. The air, which enters into space or plenum 72a between the inner surface of case 52 and the sidewalls of the cell members, reaches air electrodes 60 via grooves 66 in air electrode backing plates 64 and then exits the battery through an exit port 73 in plenum 72b on the other side of the battery. The incoming air passes through a scrubber 94 which removes any carbon dioxide in the air. Scrubber 94 may comprise a lithium hydroxide scrubber or any other material capable of reacting with the carbon dioxide in the incoming air such as, for example, calcium hydroxide, sodium hydroxide, or mixtures of these hydroxides, e.g., soda-lime.

On the opposite side of the battery, electrolyte inlet and outlet openings 76 are provided through case 52 through which electrolyte inlet tubes 80 and electrolyte outlet tubes 84 pass respectively from inlet port 28 to bore 26 and outlet port 24 from bore 22 of each zinc electrode 10. Inlet tubes 80 are connected to a manifold 82 through which electrolyte from an external reservoir 96 is pumped to the battery by a pump 98 through pipes 95. Outlet tubes 84 are connected to an electrolyte outlet manifold 86 from which the electrolyte passes into a solids filter 92, through pipe 91, which removes any solids, e.g., carbonates, in the electrolyte. The filtered electrolyte then passes into reservoir 96 via pipe 93. The filter material in solids filter 92 may comprise any material which is chemically inert to the alkaline electrolyte and capable of removing undesirable solids. Examples of satisfactory filter material include a fibrous porous foam of polytetrafluoroethylene available as Zitex from Norton (Chemplant Division).

Reservoir 96 is provided with a drain 100 having a valve 102 which permits some or all of the electrolyte from the battery to be removed from the system as desired. Fresh electrolyte may then be admitted into reservoir 96 via fresh electrolyte inlet tube 110 and valve 112. Fresh or makeup water may be added to the electrolyte via water inlet tube 120 and valve 122 to replenish water loss from the electrolyte due to transpiration of water vapor into the process air stream.

While FIG. 5 illustrates a battery containing a plurality of the cells of the invention, it will be appreciated that case 52 and the associated external electrolyte circulation system just described may be used as well with a single cell as with a multiple cell battery. Basically, the only difference in the components of each cell of a multiple cell battery from a single cell will be the provision of grooves 66 on both sides of air electrode backing plate 64' when backing plate 64' is located between the respective air electrodes of adjacent cells in the battery as shown in FIG. 5.

During operation of the cells of the battery, electrolyte from reservoir 96 is pumped into the lower bore 22 of each zinc electrode, via inlet manifold 82 and inlet tubes 80, from which it passes through the vertical bores 30 in frame 14 to the zinc-coated foam electrode. The electrolyte then passes through vertical bores 32 to upper horizontal bore 26 from which it flows out of the battery via outlet tubes 84 and outlet manifold 86. Solids accumulating in the electrolyte may then be filtered out, further makeup water added, as well as fresh electrolyte added, and spent electrolyte removed as desired. Upward pumped flow through the electrode is desirable to provide uniform flow as well as to eliminate gas (air) pockets in the electrolyte.

To further illustrate the invention, 1.5 Ah cells were constructed in accordance with the invention and cycled with constant current charge-discharge cycles of 4 hours (C/4). The cells achieved 600 C/4 cycles, with end of life defined as loss of capacity at the C/4 rate. The beginning of life (BOL) single cell voltages were 1.29V out $-1.85$V in. The end of life (EOL) single cell voltages were 1.25V out $-1.90$V in.

Based on these tests, it is calculated that a battery can be made comprising four multicell modules, each formed from a series connection of 125 single cells with 50 Ah (32 cm×32 cm×0.8 cm) capacity. The four modules may be electrically connected in parallel to form the total power source. Each module, however, would have an independent electrolyte circulation system with a 1/20 hp electric pump. At the C/4 rate, the current density in each cell is 12.5 mA/cm$^2$, and for standard overnight charging would be 3.125 mA/cm$^2$. The zinc loading at full charge is designed to be 50 mAh/cm$^2$. The design temperature for discharge is 50°-55° C., thermostatically controlled via the circulating electrolyte. For charging, the design temperature is 40°-45° C. The electrolyte is 12M KOH containing 260 g Zn/L at complete discharge, and for a capacity of 32 kWh, an electrolyte volume of 116 L would be required, about 40 L in the stacks and 80 L in external components (reservoir, pumps, manifold, etc.).

The resulting power source characteristics for such a battery (based on previous cell tests) would be:

| | |
|---|---|
| Volume: | 600 L |
| Weight: | 300 kg |
| Capacity: | 32 kWh |
| Average Power: | 7.8 kW |
| Peak Power (20 sec): | 65 kW (BOL) |
| | 55 kW (EOL) |
| Current-Voltage: (discharge) | 162 V/50 A at C/4 (BOL) |
| | 143 V/460 A at peak (BOL) |
| | 156 V/50 A at C/4 (EOL) |
| | 125 V/460 A at peak (EOL) |
| Current-Voltage: (charge) | 230 V at C/8 (BOL) |
| | 227 V at C/16 (BOL) |
| | 235 V at C/8 (EOL) |
| | 232 V at C/16 (EOL) |

Thus, the invention provides an improved zinc electrode for a rechargeable zinc-air cell/battery comprising a zinc electrode carried on a foam support which has been treated to inhibit dendrite formation on the outer surface thereof and through which an electrolyte may be circulated. The invention further provides an improved rechargeable zinc-air cell or battery which utilizes the improved zinc electrode and provides for an alkaline electrolyte circulating through the zinc electrode which electrolyte may be externally treated and/or replenished as needed.

While a specific embodiment of the zinc electrode and the rechargeable zinc-air battery made therefrom has been illustrated and described as well as the method for making the zinc electrode in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An improved zinc electrode for a rechargeable zinc-air battery comprising an outer frame, a porous foam electrode support within said frame having zinc deposited thereon and treated prior to the deposition of zinc thereon to inhibit the formation of zinc dendrites on the external surface thereof, and means within said outer frame for circulating an alkaline electrolyte through the interior of said treated zinc-coated porous foam.

2. The zinc electrode of claim 1 wherein said porous foam electrode support is treated with a material to render the treated external surface inactive for zinc deposition.

3. The zinc electrode of claim 2 wherein said treatment material comprises a 1-5 micron layer of an electrically insulating and electrochemically inert material.

4. The zinc electrode of claim 3 wherein said treatment material is selected from the class consisting of fluoroethylenepropylene and polyvinylidene fluoride.

5. The zinc electrode of claim 3 wherein said porous foam electrode support has a mean pore size of from about 5 to about 300 microns and a surface area of at least about 25 cm$^2$/cm$^3$.

6. The zinc electrode of claim 5 wherein said porous foam electrode support has a mean pore size of from about 10 to about 100 microns and a surface area of at least about 50 cm$^2$/cm$^3$.

7. The zinc electrode of claim 5 wherein said porous foam electrode support is selected from the class consisting of carbon foam and a metal foam.

8. The zinc electrode of claim 7 wherein said porous foam electrode support consists essentially of a carbon foam.

9. The zinc electrode of claim 7 wherein said porous foam electrode support consists essentially of a metal foam.

10. The zinc electrode of claim 3 wherein said outer frame consists essentially of a plastic material possessing sufficient mechanical strength as well as generally exhibiting chemical inertness to the alkaline electrolyte as well as the electrochemical reactions taking place in a battery in which the zinc electrode is placed.

11. The zinc electrode of claim 3 wherein said outer frame consists essentially of a plastic material selected from the class consisting of polypropylene, polyethylene, polytetrafluoroethylene, and polychlorotrifluoroethylene.

12. The zinc electrode of claim 3 wherein said outer frame contains a central opening containing said porous foam electrode support.

13. The zinc electrode of claim 12 wherein said outer frame contains a first horizontal bore beneath said central opening and a second horizontal bore above said central opening and a plurality of vertical bores respectively communicating between said lower horizontal bore and said central opening, and said upper horizontal bore and said central opening; whereby electrolyte may be circulated through said electrode through an inlet to one of said horizontal bores and removed from said electrode through an outlet connected to the other of said horizontal bores.

14. An improved zinc electrode for a rechargeable zinc-air battery comprising:
   (a) an outer frame consisting essentially of a plastic material exhibiting chemical inertness to the alkaline electrolyte as well as the electrochemical reactions taking place in a rechargeable zinc-air battery;
   (b) a central opening within said frame;
   (c) a porous foam electrode support within said central opening in said frame selected from the class consisting of carbon foam and a metal foam and having a mean pore size of from about 5 to about 300 microns and a surface area of at least about 25 cm$^2$/cm$^3$;
   (d) a 1-5 micron layer of an electrically insulating and electrochemically inert material on the external surface of said porous foam electrode support to render the treated surface inactive for zinc deposition to inhibit the formation of zinc dendrites on the surface thereof;
   (e) a layer of zinc electrolytically deposited on said treated porous foam electrode support; and
   (f) means within said outer frame for circulating an alkaline electrolyte through the interior of said zinc-coated foam comprising a first horizontal bore beneath said central opening and a second horizontal bore above said central opening and a plurality of vertical bores respectively communicating between said lower horizontal bore and said central opening, and said upper horizontal bore and said central opening; whereby electrolyte may be circulated through said electrode through an inlet to one of said horizontal bores and removed from said electrode through an outlet connected to the other of said horizontal bores.

15. A method of forming an improved zinc electrode for a rechargeable zinc-air battery which comprises:
   (a) forming an outer electrode frame from a plastic material exhibiting chemical inertness to the alkaline electrolyte as well as the electrochemical reactions taking place in a rechargeable zinc-air battery;
   (b) forming a central opening within said frame;
   (c) mounting a porous foam electrode support within said central opening in said frame selected from the class consisting of carbon foam and a metal foam, said foam having a mean pore size of from about 5 to about 300 microns and a surface area of at least about 25 cm$^2$/cm$^3$;
   (d) treating the external surface of said porous foam electrode support with a 1-5 micron layer of an electrically insulating and electrochemically inert material to render the treated surface inactive for zinc deposition to inhibit the formation of zinc dendrites on the surface thereof;
   (e) electrolytically depositing a layer of zinc on said treated porous foam electrode support; and
   (f) forming means within said outer frame for circulating an alkaline electrolyte through said zinc-coated foam comprising a first horizontal bore beneath said central opening and a second horizontal bore above said central opening and a plurality of vertical bores respectively communicating between said lower horizontal bore and said central opening, and said upper horizontal bore and said central opening; whereby electrolyte may be circulated through said electrode through an inlet to one of said horizontal bores and removed from said electrode through an outlet connected to the other of said horizontal bores.

16. An improved rechargeable zinc-air battery comprising:
   (a) a battery case;
   (b) zinc electrode means within said case comprising outer frame means, a porous foam electrode support within said frame means having zinc deposited thereon and treated to inhibit the formation of zinc dendrites on the surface thereof, and internal electrolyte circulation means within said outer frame means for circulating an alkaline electrolyte through said zinc-coated foam;
   (c) at least one air electrode means within said case;
   (d) porous separator means located between said zinc electrode means and said air electrode means;
   (e) an alkaline electrolyte within said battery circulating through said zinc electrode means via said internal electrolyte circulations means; and
   (f) external electrolyte circulation means for circulating said alkaline electrolyte to said internal circulation means.

17. The rechargeable zinc-air battery of claim 16 wherein said battery is further provided with at least one air electrode backing plate abutting the surface of said air electrode means opposite to the surface facing said zinc electrode means; and air passage means on a surface of said air electrode backing plate abutting said air electrode means and extending to the side surface of said backing plate to facilitate the passage of air to said air electrode means.

18. The rechargeable zinc-air battery of claim 17 wherein said battery case is further provided with one or more air inlet ports; air scrubber means connected to said one or more air inlet ports external to said battery case to remove carbon dioxide from said incoming air; and one or more air passages within said battery case between said one or more air inlets and said air electrode means.

19. The rechargeable zinc-air battery of claim 16 wherein said external electrolyte circulation means comprise an electrolyte reservoir external to said battery case; filter means to filter solids out of said electrolyte as it circulates from said zinc electrode within said battery case to said external reservoir; pump means for recirculating electrolyte from said external reservoir to said zinc electrode within said battery case; means for optionally adding water to said electrolyte; and means for optionally replacing at least a portion of said electrolyte with fresh electrolyte.

20. An improved rechargeable zinc-air battery system comprising:
 (a) a battery case having one or more air inlet ports and electrolyte inlet and outlet ports formed therein;
 (b) air scrubber means connected to said one or more air inlet ports external to said battery case to remove carbon dioxide from said incoming air;
 (c) zinc electrode means within said case comprising:
   (1) zinc electrode outer frame means;
   (2) a porous foam electrode support within said frame means having zinc deposited thereon and treated to inhibit the formation of zinc dendrites on the external surface thereof; and
   (3) internal electrolyte circulation means comprising passageways within said outer frame means for circulating an alkaline electrolyte through said zinc-coated foam;
 (d) at least one air electrode means within said case having a surface facing said zinc electrode means;
 (e) one or more air passages within said battery case between said one or more air inlets and said air electrode means;
 (f) porous separator means located between said zinc electrode means and said air electrode means;
 (g) at least one air electrode backing plate abutting the surface of said air electrode means opposite to the surface facing said zinc electrode means;
 (h) air passage means on a surface of said air electrode backing plate abutting said air electrode means and extending to the side surface of said backing plate to facilitate the passage of air to said air electrode means;
 (i) an alkaline electrolyte within said battery circulating through said zinc electrode means via said internal electrolyte circulations means; and
 (j) external electrolyte circulation means for circulating said alkaline electrolyte to said internal circulation means comprising:
   (1) an electrolyte reservoir external to said battery case;
   (2) means for connecting said external electrolyte circulation means to said internal electrolyte circulation means in said zinc electrode outer frame means through said electrolyte inlet and outlet ports in said battery case;
   (3) filter means to filter solids out of said electrolyte as it circulates from said zinc electrode within said battery case to said external reservoir;
   (4) pump means for recirculating electrolyte from said external reservoir to said zinc electrode within said battery case via said connecting means;
   (5) means for optionally adding water to said electrolyte; and
   (6) means for optionally replacing at least a portion of said electrolyte with fresh electrolyte.

* * * * *